United States Patent [19]

Fuchikami et al.

[11] Patent Number: 4,500,645

[45] Date of Patent: Feb. 19, 1985

[54] HYDROCRACKING CATALYST COMPOSITION AND METHOD OF MAKING SAME

[75] Inventors: Jun Fuchikami, Koga; Hidehiro Higashi, Kitakyushu; Takashi Inoue, Kitakyushu; Hiroyuki Oba, Kitakyushu, all of Japan

[73] Assignee: Catalysts & Chemicals Industries Co., Ltd., Tokyo, Japan

[21] Appl. No.: 385,357

[22] Filed: Jun. 7, 1982

[30] Foreign Application Priority Data

Jun. 13, 1981 [JP] Japan .................................. 56-91109

[51] Int. Cl.³ .......................... B01J 29/10; B01J 29/16
[52] U.S. Cl. ........................................ 502/65; 502/66; 502/79
[58] Field of Search ..................... 252/455 Z; 208/111, 208/112; 502/66, 65, 79

[56] References Cited

U.S. PATENT DOCUMENTS

| 2,388,937 | 11/1945 | Schmerling et al. | 208/112 |
| 2,917,532 | 12/1959 | Watkins | 208/112 X |
| 3,053,755 | 11/1962 | Hansford et al. | 208/112 X |
| 3,557,024 | 1/1971 | Young et al. | 252/455 Z |
| 3,617,507 | 11/1971 | Oettinger et al. | 252/455 Z |
| 3,660,274 | 5/1972 | Blazek et al. | 252/455 Z |
| 3,954,670 | 5/1976 | Pine | 252/455 Z |
| 4,212,771 | 7/1980 | Hamner | 252/455 Z |

*Primary Examiner*—Carl F. Dees
*Attorney, Agent, or Firm*—Flynn, Thiel, Boutell & Tanis

[57] ABSTRACT

A hydrocracking catalyst composition comprising metals of Group VIb and Group VIII deposited on a carrier material consisting of Y-zeolite and one or more members of the group consisting of alumina/zinc oxide, alumina/boria and alumina/silica/magnesia, the greater part of the pores of said composition having a diameter of 70–110 Å even when measured by nitrogen adsorption method or by means of a porosimeter under pressure. The catalyst composition having the pores as mentioned above is made by using, as an alumina component of the carrier material, an alumina cake obtained from an amorphous alumina hydrate slurry containing a pseudoboehmite having a crystal size grown in the range of 40 to 80 Å.

12 Claims, 1 Drawing Figure

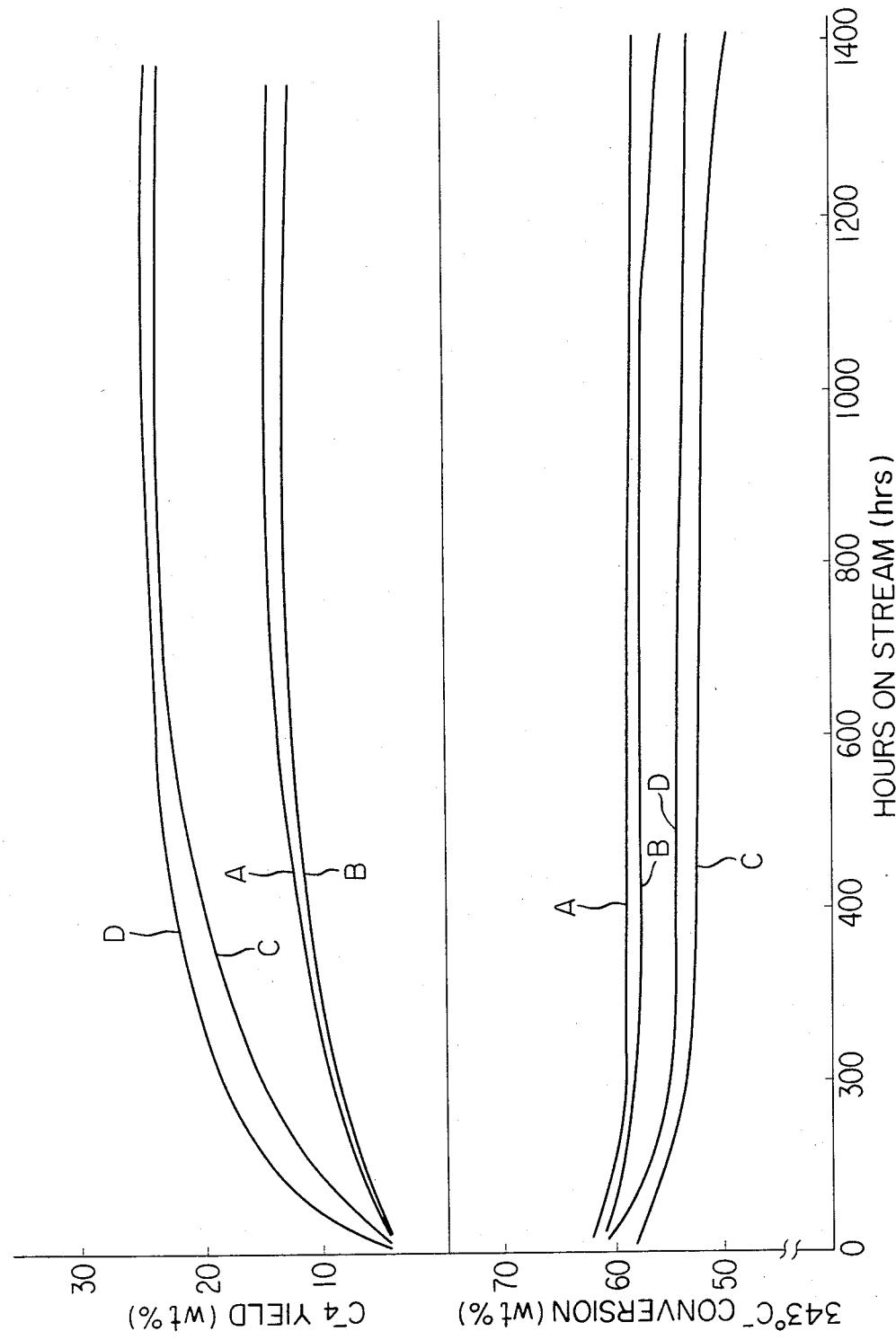

HYDROCRACKING CATALYST COMPOSITION AND METHOD OF MAKING SAME

BACKGROUND OF THE INVENTION

The present invention relates to a catalyst composition suitably used in hydrocracking a heavy oil, in particular relates to a hydrocracking catalyst composition which comprises metals of Group VIb and Group VIII of the Periodic Table deposited on a carrier material consisting of Y-zeolite and one or more members of the group consisting of alumina-zinc oxide, alumina-boria and alumina-silica-magnesia, said composition having a specific pore diameter and pore size distribution referred to afterwards, and a method of making same.

As a catalyst for use in hydrocracking a heavy oil there is hitherto known one comprising a hydrogenatively active metal deposited on an amorphous inorganic oxide. However, since the catalyst of this type is not so high in activity, there is necessity of adopting such severe reaction conditions as a high reaction temperature or a low liquid hourly space velocity when carrying out a hydrocracking process using said catalyst. In this regard, it is to be noted that adoption of a high reaction temperature promotes deposition of carbonaceous materials or heavy metals such as nickel, vanadium and the like on the catalyst, thereby producing an undesirable result of shortening the catalyst life. On the other hand, when intending to compensate for the low activity of the catalyst by selecting a liquid hourly space velocity, there must be adopted an extremely low liquid hourly space velocity. Hence, it is impossible to find a practical value in the practice of hydrocracking process under such conditions.

For the purpose of improving the low activity of the catalyst of this type, of late there has been developed a zeolite-containing hydrocracking catalyst. This zeolite-containing catalyst displays a high cracking activity as compared with a zeolite-free one, and possesses an ability to hydrocrack a heavy oil at a relatively low temperature. However, the fact is that the zeolite-containing catalyst of this type exclusively relies on the zeolite having a markedly strong solid acidic property for its cracking activity. Therefore, when hydrocracking a heavy oil using this catalyst, it is impossible to selectively produce a middle fraction without sacrificing the conversion to a certain degree. In other words, if the reaction temperature is raised to increase the conversion, it will result in that as the heavy oil feed is cracked into short-chain hydrocarbons more than necessary, the amount of gaseous component to be produced increases that much, whereby the yield of the middle fraction decreases.

The above mentioned problem inherent in the zeolite-containing catalyst, indeed, may be solved in the manner of allotting a part of the cracking activity in said catalyst to a comparatively mild solid acidic substance other than zeolite, for instance, such as boria, magnesia or the like. However, the conventional zeolite-containing catalysts, irrespective of whether they contain relatively mild solid acidic substances or not, are defective in that their active sites are destroyed by the action of asphaltene and the like contained inevitably in heavy oil, due to the lack of sufficient consideratrionn as to the pore diameter and pore size distribution of catalysts, and consequently their catalytic activity is liable to decay in a relatively short period of time.

SUMMARY OF THE INVENTION

The present invention provides a hydrocracking catalyst composition which is capable of decreasing the amount of gaseous component to be by-produced even when a high conversion is maintained, consequently producing a middle fraction selectively and further prolonging the life of catalytic activity, in the manner of selecting, as a relatively mild solid acid, zinc oxide, boria or silica-magnesia and using this concurrently with alumina and zeolite as well as regulating the pore diameter and pore size distribution of the catalyst.

That is, the hydrocracking catalyst composition according to the present invention is a hydrocracking catalyst composition for use in heavy oil comprising metals of Group VIb and Group VIII of the Periodic Table deposited on a carrier material consisting of a mixture of Y-zeolite and one or more members of the group consisting of alumina-zinc oxide, alumina-boria and alumina-silica-magnesia, said catalyst composition satisfying the following requirements (A) and (B):

(A) when measured by nitrogen and adsorption method, pores whose diameters are in the range of 25–600 Å have an average diameter of 70–110 Å, the volume occupied by pores whose diameters are 60–120 Å is at least 40% of that occupied by pores whose diameters are 25–600 Å, and the volume occupied by pores whose diameters are 25–60 Å is 30% or less of that occupied by pores whose diameters are 25–600 Å, and (B) when measured by means of a porosimeter under pressure, pores whose diameters are in the range of 62–600 Å have an average diameter of 70–110 Å, the volume occupied by pores whose diameters are in the range of average diameter ±20 Å is at least 40% of that occupied by pores whose diameters are 62–600 Å, and the volume occupied by pores whose diameters are in the range of average diameter +20 Å or more is 40% or less of that occupied by pores whose diameters are 62–600 Å.

BRIEF DESCRIPTION OF THE DRAWING

The appended drawing shows graphs illustrating the relationship of hours on stream of the heavy oil feed for each of the catalysts of 343° C.$^-$ conversion and $C_4^-$ yield respectively.

DETAILED DESCRIPTION OF THE INVENTION

In the catalyst composition according to the present invention, the carrier material is comprised of a mixture consisting of alumina, Y-zeolite and further a third component selected from zinc oxide, boria and silica-magnesia. The amount of said Y-zeolite compounded is generally in the range of 10–60 wt.% of the carrier, and is regulated properly within this range depending upon the property of heavy oil. For instance, when treating an extremely heavy oil such as topped crude it is preferable that the amount of Y-zeolite used should be 30–60 wt.% of the carrier, while when treating a little heavy oil such as vacuum gas oil it is preferable that the amount of Y-zeolite used should be 10–40 wt.% of the carrier. In either case, when the amount of Y-zeolite is less than 10 wt.% of the carrier the conversion of heavy oil deteriorates, and inversely when it is over 60 wt.% the amount of gaseous component produced increases. Therefore, both are not preferable.

The third component selected from zinc oxide, boria and silica-magnesia is preferably compounded in an amount ranging 5-30 wt.% of the alumina contained in the carrier. The reason is that the third component in this range can contain a largest amount of acid in the form of solid acid and further can display a preferable acidity distribution. In this regard, it is to be noted that when the third component is compounded in excess of 30 wt.% of the alumina, it becomes difficult to obtain a catalyst composition satisfying both requirements (A) and (B) as mentioned above.

Referring to metals of Group VIb and Group VIII of the Periodic Table to be deposited on the carrier material comprised of a mixture of alumina, Y-zeolite and the third component, as Group VIb metal components there are employed chromium, molybdenum and tungsten, preferably tungsten, and Group VIII metal components there are employed iron, cobalt, nickel, ruthenium, rhodium, palladium, osmium, iridium and platinum, preferably nickel. Referring to the amounts of these metal components to be deposited, the Group VIb metal component is deposited in an amount, as metal, of 5-24 wt.%, preferably 7-16 wt.%, of the final catalyst composition, while Group VIII metal component is deposited in an amount, as metal, of 0.5-8 wt.%, preferably 1.5-5 wt.%, of the final catalyst composition.

Next, explanation will be made on the method of making the catalyst composition according to the present invention. The catalyst composition according to the present invention, characterized by having the pore diameter and pore size distribution as defined by the above mentioned both requirements (A) and (B), is made by a method of mixing Y-zeolite and one or more members of the group consisting of a precursor to zinc oxide, precursor to boria and silica-magnesia with an alumina cake obtained from an amorphous alumina hydrate slurry containing a pseudo-boehmite having a crystal size grown to 40-80 Å to thereby obtain a carrier material, and depositing metals of Group VIb and Group VIII of the Periodic Table on said carrier material.

As the pore diameter and pore size distribution of the final catalyst composition according to the present invention are controlled by alumina so far as the carrier components, namely alumina, Y-zeolite and the third component are compounded in above defined amounts, it is preferable that the precursor to alumina used as the carrier component of the present invention should be an alumina cake obtained from an amorphous alumina hydrate slurry containing a pseudo-boehmite having a crystal size grown to 40-80 Å. The alumina cake of this kind can be obtained in the manner of preparing an amorphous alumina hydrate slurry having a concentration of 5 wt.% or more, preferably 8 wt.% or more, by neutralyzing aluminate or aluminum salt with acid or alkali; adding acid or alkali to this slurry for controlling the pH value of said slurry to be weak alkaline, namely 8-12, preferably 9-11; thereafter heating the slurry with stirring at this pH range to a temperature of 50° C. or more, preferably 80° C. or more for growing the crystal size of a pseudo-boehmite; and then recovering the cake from said slurry.

The alumina obtained by drying and calcining the above mentioned alumina cake possesses the pore diameter and pore size distribution satisfying the under mentioned requirements (a) and (b):

(a) when measured by nitrogen adsorption method, pores whose diameters are in the range of 0-600 Å have an average diameter of 110-140 Å, the volume occupied by pores whose diameters are 100-150 Å is at least 70% of that occupied by pores whose diameters are 0-600 Å, and the volume occupied by pores whose diameters are 0-60 Å is 10% or less of that occupied by pores whose diameters are 0-600 Å, and (b) when measured by means of a porosimeter under pressure, pores whose diameters are in the range of 62-600 Å have an average diameter of 100-140 Å, the volume occupied by pores whose diameters are in the range of average diameter ± 10 Å is at least 60% of that occupied by pores whose diameters are 62-600 Å, and the volume occupied by pores whose diameters are in the range of average diameter + 10 Å or more is 10% or less of that occupied by pores whose diameters are 62-600 Å.

According to the present invention, the above mentioned alumina cake is compounded with the third component and Y-zeolite. In this instance, when zinc oxide or boria is used as the third component, it is compounded with the alumina cake in the form of precursor, for instance, in the form of an aqueous boric acid or zinc nitrate solution. When silica-magnesia is used as the third component, it is compounded with the alumina cake in the form of powder. Y-zeolite may be compounded with the alumina cake in the form as-produced by a usual synthesis method. However, the use of Y-zeolite whose alkali metal ions have been exchanged by ammonium ions and/or rare earth metal ions may improve the acidity of Y-zeolite and promote the catalytic activity. It is most preferable to use the Y-zeolite whose alkali metal ions have been exchanged by both ammonium ions and rare earth metal ions.

Ammonium ion exchange is effected by the steps of contacting an aqueous solution of ammonium salt such as ammonium chloride, ammonium nitrate or the like with Y-zeolite, then washing and drying the zeolite. Likewise, rare earth ion exchange is effected by steps of contacting an aqueous solution of rare earth metal chloride, sulfate or the like with Y-zeolite, then washing and drying the zeolite. In either case, the above mentioned operation comprising ion exchanging-washing-drying is repeated in order to improve the ion exchange rate and deteriorate the residual amount of alkali in Y-zeolite. When ion exchange of Y-zeolite is effected using ammonium ions alone, a substantial ion exchange result can not be expected without maintaining the exchange rate of at least 70% or more, normally 90% or more. When said ion exchange is effected using rare earth metal ions alone, whilst, a substantial ion exchange result can not be revealed without maintaining the exchange rate of at least 50% or more, normally 60% or more. When ion exchange of Y-zeolite is effected using both ammonium ions and rare earth metal ions, either ion exchange may precede. However, it is more preferable that ion exchange should be effected first using rare earth metal ions and then using ammonium ions. When exchange rate of rare earth metal ions is maintained at 20-90%, preferably 40-80% and additionally the residual alkali metal is subjected to ammonium ion exchange for lowering the alkali content in Y-zeolite to 10% or less, preferably 5% or less, the catalyst obtained using this is allowed to have a more improved hydrocracking ability.

As the rare earth metals used in the present invention there are enumerated lanthanum, cerium, praseodymium, neodymium, samarium and the like. One kind or two kinds or more of them can be used for ion exchange purpose, but in the actual ion exchange operation it is practically preferable to use a mixture of rare earth metals comprising 40-50% of cerium, 20-25% of lanthanum and 15-25% of neodymium.

The mixture obtained by compounding the third component and Y-zeolite with the alumina cake is normally well kneaded by means of a kneader and molded in suitable shape and size after removal of surplus water if needed. Thereafter, the molded body is calcined at a temperature of about 500°-600° C., and then made to deposit thereon one or more metals of Group VIb of the Periodic Table and one or more metals of Group VIII of the Period Table by virtue of a well-known manner, for instance, such as impregnation or the like, whereby the catalyst composition according to the present invention can be obtained. The thus obtained catalyst composition according to the present invention has normally a specific surface area of 200-400 m$^2$/g and its pore volume of in the range of 0.3-0.8 ml/g.

As is evident from the above details, the catalyst composition according to the present invention is designed to make Y-zeolite and the third component, namely zinc oxide, boria or silica-magnesia, undertake its cracking activity, and therefore can produce the middle fraction with a high selectivity in the manner of restraining the production of gaseous component without sacrificing the conversion. In the case of the catalyst composition according to the present invention which has the specific pore diameter and pore size distribution, additionally, every pore is prevented from invasion of huge molecules of asphaltene and the like which is the cause of catalyst poisoning, whereby its catalytic activity can be held at a high level for a long period of time.

Accordingly, the catalyst composition according to the present invention may be said to possess an especially superior aptitude as a catalyst for use in hydrocracking heavy oils such as topped crude, vacuum residue, visbreaking process efflux, tar sand oil, black oil and the like. But, it is needless to say that said catalyst composition is also available for the purpose of hydrocracking light oil, catalytic cracking recycle oil and the like. In the case of hydrocracking heaavy oil using the catalyst composition according to the present invention, it is possible to employ the broad reaction conditions including conventionally used reaction conditions, but normally there are employed the reaction conditions including a reaction temperature of 300°-500° C., a reaction pressure of 30-200 Kg/cm$^2$, a hydrogen/oil ratio of 200-3000 Nm$^3$/Kl, a LHSV of 0.1-5.0 hr$^{-1}$ and a hydrogen concentration of 75 mol % or more. And, as preferable reaction conditions there can be enumerated a reaction temperature of 350°-450° C., a reaction pressure of 50-170 Kg/cm$^2$, a hydrogen/oil ratio of 500-2000 Nm$^3$/Kl, a LHSV of 0.2-3.0 hr$^{-1}$ and a hydrogen concentration of 85 mol % or more.

Next, the characteristics of the present invention will be more detailed with reference to examples and comparative examples as shown below.

EXAMPLE 1

A slurry having the pH 7.0 was obtained by adding a 50% gluconic acid aqueous solution to a sodium aluminate solution having a concentration of 5.0 wt.% as Al$_2$O$_3$, and then adding thereto an aluminum sulfate solution having a concentration of 2.5 wt.% as Al$_2$O$_3$. This slurry was filtered by means of a table filter and then the resulting filter cake was washed with 0.2 wt.% of ammonia water to thereby prepare a pseudo-boehmite-containing alumina hydrate. This alumina hydrate was added with a small amount of ammonia water and made into a slurry having the Al$_2$O$_3$ concentration of 8.8 wt.% and the pH 10.60. This slurry was subjected to 20 hours' reflux at 95° C. with stirring and thereafter was dehydrated at an elevated temperature by means of a kneader to thereby obtain an alumina cake (X).

This alumina cake (X) was molded into granules having a diameter of 0.9 mm by means of an extruder, dried at 110° C. for 16 hours in air, and thereafter calcined at 550° C. for 3 hours. The pore diameter and pore size distribution of the calcined extrudate were as shown below:

(a) The pore diameter and pore size distribution measured by nitrogen adsorption method.
Average diameter of pores having diameters 0-600 Å = 134 Å

$$\frac{\text{Volume of pores having diameters 100-150 Å}}{\text{Volume of pores having diameters 0-600 Å}} = 84.0\%$$

$$\frac{\text{Volume of pores having diameters 0-60 Å}}{\text{Volume of pores having diameters 0-600 Å}} = 1.2\%$$

(b) The pore diameter and pore size distribution measured using a porosimeter under pressure.
Average diameter of pores having diameters 62-600 Å = 128 Å

$$\frac{\text{Volume of pores having diameters 128 ± 10 Å}}{\text{Volume of pores having diameters 62-600 Å}} = 90.4\%$$

$$\frac{\text{Volume of pores having diameters (128 ± 10) Å or more}}{\text{Volume of pores having diameters 62-600 Å}} = 6.4\%$$

On the other hand, Y-zeolite was added to a 5% solution of rare earth metals chlorides (principal components: CaCl$_3$, LaCl$_3$ and NdCl$_3$) to obtain a slurry. The slurry was added with ammonia water so that the pH became 5, stirred at 80° C. for 30 minutes, dehydrated and washed to thereby obtain a rare earth metal-exchanged Y-zeolite (rate of exchange: 72.4%). Thereafter, the resulting zeolite was subjected to an ammonium exchange by the use of a 5% ammonium nitrate solution to obtain a rare earth metal-ammonium exchanged Y-zeolite (which will be abridged "REHY zeolite" hereinafter). This zeolite showed that the exchange rate of said rare earth metal was 65.2%, the exchange rate of ammonium was 25.4% and the content of Na$_2$O was 1.04%.

Then, a solution of 130 g of zinc nitrate in 1 l of water, 1060 g of said alumina cake (X) and 400 g of REHY zeolite were mixed, kneaded by means of a kneader, thereafter molded into granules having a diameter of 0.9 mm, dried at 110° C. for 16 hours in air, and then calcined at 550° C. for 3 hours to thereby obtain a carrier material wherein the amount of zinc oxide contained in the alumina matrix was 10 wt.% and the amount of REHY zeolite contained in the carrier material was 50 wt.%. 396 ml of an aqueous solution containing 161 g of ammonium paratungstate and 132 g of nickel nitrate were added to 660 g of said carrier material for impregnation, then dried and calcined to thereby obtain Catalyst A. The amounts of tungsten and nickel deposited on this catalyst were 13.5 wt.% and 3.1 wt.%, calculated as elemental metal, on the basis of the weight of the final catalyst, respectively.

EXAMPLE 2

An aqueous solution obtained by adding 100 g of boric acid to 120 ml of water at an elevated temperature, 1000 g of the alumina cake prepared in Example 1 and 400 g of REHY zeolite were mixed together, and then treated under the same conditions as employed in Example 1 to thereby obtain a carrier material wherein the amount of boria contained in the alumina matrix was 15 wt.% and the amount of REHY zeolite contained in the carrier material was 50 wt.%.

Metal components were deposited on this carrier material according to the same procedure as Example 1 to thereby prepare Catalyst B wherein the amounts of tungsten and nickel deposited thereon were 13.5 wt.% and 3.1 wt.% respectively.

COMPARATIVE EXAMPLE 1

A slurry having the pH 7.0 was obtained by adding an aluminum sulfate having a concentration of 1.0 wt.% as $Al_2O_3$ to a sodium aluminate solution having a concentration of 2.0 wt.% as $Al_2O_3$. This slurry was filtered by means of a table filter and then the resulting filter cake was washed with ammonia water to thereby prepare a pseudo-boehmite-containing alumina hydrate. This alumina hydrate was divided in two parts. A small amount of ammonia water was added to the one to obtain a slurry having a concentration of 8.5 wt.% as $Al_2O_3$ and a pH 10.5. The resulting slurry was subjected to 20 hours' reflux at 95° C. with stirring. Then, the other alumina hydrate divided previously was added to said slurry and spray-dried. The resulting powder was added with ammonia water and kneaded by means of a kneaker, thereby obtaining a moldable alumina cake (Y).

This alumina cake (Y) was molded into granules having a diameter of 0.9 mm by means of an extruder, dried at 110° C. for 16 hours in air, and thereafter calcined at 550° C. for 3 hours. The pore diameter and pore size distribution of the calcinated extrudate were as shown below:

(a) The pore diameter and pore size distribution measured by nitrogen adsorption method
Average diameter of pores having diameters 0–600 Å = 156 Å

$$\frac{\text{Volume of pores having diameters 100–150 Å}}{\text{Volume of pores having diameters 0–600 Å}} = 29.8\%$$

$$\frac{\text{Volume of pores having diameters 0–60 Å}}{\text{Volume of pores having diameters 0–600 Å}} = 0\%$$

(b) The pore diameter and pore size distribution measured using a porosimeter under pressure
Average diameter of pores having diameters 62–600 Å = 151 Å

$$\frac{\text{Volume of pores having diameters 151 Å} \pm 10 \text{ Å}}{\text{Volume of pores having diameters 62–600 Å}} = 59.1\%$$

$$\frac{\text{Volume of pores having diameters (151 + 10) Å or more}}{\text{Volume of pores having diameters 62–600 Å}} = 22.0\%$$

400 g of REHY zeolite were added to 1 Kg of the above mentioned alumina cake (Y), kneaded by means of a kneader, then molded into granules having a diameter of 0.9 mm, dried at 100° C. for 16 hours in air, and then calcined at 550° C. for 3 hours to thereby obtain a carrier material containing 50 wt.% of REHY zeolite. Metals were deposited on this carrier in accordance with the same procedures as Example 1, thereby preparing Catalyst C wherein the amounts of tungsten and nickel deposited thereon were 13.5 wt.% and 3.1 wt.%, calculated as elemental metal.

COMPARATIVE EXAMPLE 2

1200 g of the alumina cake (X) obtained in Example 1 and 400 g of REHY zeolite were mixed together, and treated under the same conditions as employed in Example 1 to thereby obtain a carrier material containing a third component-free REHY zeolite in an amount of 50% by weight. Metals were deposited on this carrier according to the same procedure as employed in Example 1 to thereby prepare Catalyst D wherein the amounts of tungsten and nickel were 13.5 wt.% and 3.1 wt.% were respectively.

The pore characteristics of the respective catalysts obtained in the above examples and comparative examples are as shown in Table 1.

TABLE 1

| Catalyst | A | B | C | D |
|---|---|---|---|---|
| Measured by nitrogen adsorption method | | | | |
| Average diameter of pores having diameters 25–600 Å | 87 Å | 81 Å | 116 Å | 98 Å |
| $\frac{\text{Volume of pores having diameters 60–120 Å}}{\text{Volume of pores having diameters 25–600 Å}}$ | 56% | 57% | 32% | 55% |
| $\frac{\text{Volume of pores having diameters 25–60 Å}}{\text{Volume of pores having diameters 25–600 Å}}$ | 22% | 24% | 20% | 18% |
| Measured by porosimeter under pressure | | | | |
| Average diameter of pores having diameters 62–600 Å | 98 Å | 92 Å | 114 Å | 101 Å |
| $\frac{\text{Volume of pores having average diameter} \pm 20 \text{ Å}}{\text{Volume of pores having diameters 62–600 Å}}$ | 64% | 59% | 33% | 69% |
| $\frac{\text{Volume of pores having average diameter} + 20 \text{ Å or more}}{\text{Volume of pores having diameters 62–600 Å}}$ | 18% | 25% | 37% | 15% |

EXAMPLE 3

For the purpose of confirming the results of the present invention, hydrocracking of topped oil was effected using the above mentioned catalysts A-D and under the following conditions. As a reactor there was employed a fixed-bed reaction with an inside diameter of 19 mm and a length of 3 m and charged with 200 g of catalyst.

| Properties of feed stock | |
|---|---|
| Specific gravity | 0.963 (at 15/4° C.) |
| 343° C.− | 94 vol % |
| Viscosity | 250 cst (at 50° C.) |
| Sulfur | 3.9 wt. % |
| Carbon residue | 9.0 wt. % |
| Nitrogen | 2000 ppm |
| Vanadium | 45 ppm |
| Nickel | 15 ppm |
| Reaction conditions | |
| Reaction pressure | 150 Kg/cm² |
| Reaction temperature | 400° C. |
| Hydrogen/oil ratio | 2000 Nm³/Kl |
| LHSV | 0.3 hr⁻¹ |
| Hydrogen concentration | 90 mol % |

The relationship of hours on stream of the feeds in a fixed-bed to 343° C.− conversion and $C_4^-$ yield is shown in the appended drawing. The term "343° C.− conversion" used herein means the percentage at which the heavy feeds has been converted into a component having a boiling point of 343° C. or less by virtue of a hydrocracking reaction, while the term "$C_4^-$ yield" used herein means the total amount of methane, ethane, propane and butane produced. It is clearly seen from the drawing that Catalysts A and B accoding to the present invention display not only a superior hydrocracking activity but a low $C_4^-$ yield as compared with Catalysts C and D.

We claim:

1. A hydrocracking catalyst composition comprising one or more metals selected from the metals of Group VIb and Group VIII of the Periodic Table deposited on a carrier material, said carrier material consisting essentially of Y-zeolite and one or more members selected from the group consisting of alumina-zinc oxide, alumina-boria and alumina-silica-magnesia, said catalyst composition having a porous structure satisfying the requirements (A) and (B):
  (A) when measured by the nitrogen adsorption method, pores whose diameters are in the range of 25–600 Å have an average diameter of 70–110 Å, the volume occupied by pores whose diameters are 60–120 Å is at least 40% of that occupied by pores whose diameters are 25–600 Å, and the volume occupied by pores whose diameters are 25–600 Å is 30% or less of that occupied by pores whose diameters are 25–600 Å, and
  (B) when measured by means of a porosimeter under pressure, pores whose diameters are in the range of 62–600 Å have an average diameter of 70–110 Å, the volume occupied by pores whose diameters are in the range of average diameter±20 Å is at least 40% of that occupied by pores whose diameters are 62–600 Å, and the volume occupied by pores whose diameters are in the range of average diameter+20 Å or higher is 40% or less of that occupied by pores whose diameters are 62–600 Å.

2. A catalyst composition according to claim 1 wherein said Y-zeolite is an ammonium-exchanged Y-zeolite.

3. A catalyst composition according to claim 1 wherein the Y-zeolite is a rare earth-exchanged Y-zeolite.

4. A catalyst composition according to claim 1 wherein the Y-zeolite is ion-exchanged by both rare earth and ammonium.

5. A catalyst composition according to claim 4 wherein said Y-zeolite ion-exchanged by both rare earth and ammonium contains 10% or less of alkali metal calculated as $Na_2O$.

6. A catalyst composition according to claim 1 wherein the amount of said Y-zeolite is 10–60 wt.%, based on the weight of the carrier material and the amount of a component selected from zinc oxide, boria and silica-magnesia is 5–30 wt.%, based on the weight of the alumina.

7. A catalyst composition according to claim 1 wherein said Group VIb metal is tungsten and said Group VIII metal is nickel.

8. A catalyst composition according to claim 1 wherein the amount of said Group VIb metal deposited is 5–24 wt.%, calculated as elemental metal, based on the weight of the catalyst composition, and the amount of Group VIII metal deposited is 0.5–8 wt.%, calculated as elemental metal, based on the weight of the catalyst composition.

9. A method of making a hydrocracking catalyst which comprises the steps of preparing an amorphous alumina hydrate slurry containing pseudo-boehmite having a crystal size grown to 40–80 Å; dehydrating said amorphous alumina hydrate slurry to obtain an alumina cake; mixing Y-zeolite and one or more members selected from the group consisting of a precursor of zinc oxide, a precursor of boria and silica-magnesia, with said alumina cake; molding the resulting mixture to obtain a crrier material having the desired shape and size, and thereafter depositing, on said carrier material, one or more metals selected from the metals of Group VIb and Group VIII of the Periodic Table.

10. A method according to claim 9 wherein said amorphous alumina hydrate slurry containing pseudo-boehmite having a crystal size grown to 40–80 Å is made by the steps of preparing a slurry by neutralizing an aluminate or aluminum salt with acid or alkali, and heating this neutralized slurry, with stirring, to a temperature of 50° C. or more under a weakly alkaline condition in which the pH is in the range of 8–12.

11. A method according to claim 9 wherein the precursor to zinc oxide is an aqueous zinc nitrate solution and the precursor to boria is an aqueous boric acid solution.

12. A hydrocracking catalyst composition having a specific surface area of from 200 to 400 m²/g and a pore volume of from 0.3 to 0.8 ml/g, said catalyst consisting essentially of (A) from 5 to 24 wt.% of a metal of Group VIb of the Periodic Table and (B) from 0.5 to 8 wt.% of a metal of Group VIII of the Periodic Table, deposited on (C) porous molded bodies, said porous molded bodies having been prepared by mixing porous alumina particles having pore diameters and pore size distribution satisfying the following requirements:
  (a) when measured by the nitrogen adsorption method,
    average diameter of pores having diameters of 0 to 600 Å = 110 to 140 Å, $$\frac{\text{volume of pores having diameters of from 100 to 150 Å}}{\text{volume of pores having diameters of from 0 to 600 Å}} =$$

at least 70%

$$\frac{\text{volume of pores having diameters of from 0 to 60 Å}}{\text{volume of pores having diameters of from 0 to 600 Å}} =$$

10% or lower (b) when measured using a porosimeter under pressure, average diameter of pores having diameters of from 62 to 600 Å = 100 to 140 Å

$$\frac{\text{volume of pores having diameters in the range of average diameter} \pm 10 \text{ Å}}{\text{volume of pores having diameters of from 62 to 600 Å}} =$$

at least 60%

$$\frac{\text{volume of pores having diameters in the range of average diameter} + 10 \text{ Å or higher}}{\text{volume of pores having diameters of from 62 to 600 Å}} =$$

10% or lower, with from 10 to 60 wt.%, based on the weight of the molded bodies, of a rare earth and ammonia exchanged Y-zeolite and with from 5 to 30 wt.%, based on the alumina, of one or more members selected from the group consisting of a precursor of zinc oxide, a precursor of boria and silica-magnesia, molding the resulting mixture to form the porous molded bodies and then calcining the porous molded bodies at a temperature of about 500° to about 600° C.;

said catalyst composition having pore diameters and pore size distribution satisfying the following requirements:

(a) when measured by the nitrogen adsorption method, average diameter of pores having diameters of from 25 to 600 Å = 70 to 110 Å, $$\frac{\text{volume of pores having diameters of from 60 to 120 Å}}{\text{volume of pores having diameters of from 25 to 600 Å}} =$$

= at least 40%

$$\frac{\text{volume of pores having diameters of from 25 to 60 Å}}{\text{volume of pores having diameters of from 25 to 600 Å}} =$$

= 30% or lower (b) when measured using a porosimeter under pressure, average diameter of pores having diameter of from 62 to 600 Å 70 to 110 Å, $$\frac{\text{volume of pores whose diameters are in the range of average diameter} \pm 20 \text{ Å}}{\text{volume of pores having diameters of from 62 to 600 Å}} =$$

at least 40%

$$\frac{\text{volume of pores whose diameters are in the range of average diameter} + 20 \text{ Å or higher}}{\text{volume of pores having diameters of from 62 to 600 Å}} =$$

40% or lower.

* * * * *

UNITED STATES PATENT AND TRADEMARK OFFICE
CERTIFICATE OF CORRECTION

PATENT NO. : 4 500 645
DATED : February 19, 1985
INVENTOR(S) : Jun FUCHIKAMI et al It is certified that error appears in the above-identified patent and that said Letters Patent is hereby corrected as shown below:

Column 9, line 45; change "25-600" to ---25-60---.
Column 10, line 29; change "crrier" to ---carrier---.
Column 12, line 18; change "600 Å70" to ---600 Å=70---.

Signed and Sealed this

First Day of October 1985

[SEAL]

Attest:

Attesting Officer

DONALD J. QUIGG

Commissioner of Patents and
Trademarks—Designate